(No Model.) 2 Sheets—Sheet 1.
E. SCHMITZ.
MITERING ATTACHMENT FOR CIRCULAR SAWS.
No. 420,739. Patented Feb. 4, 1890.
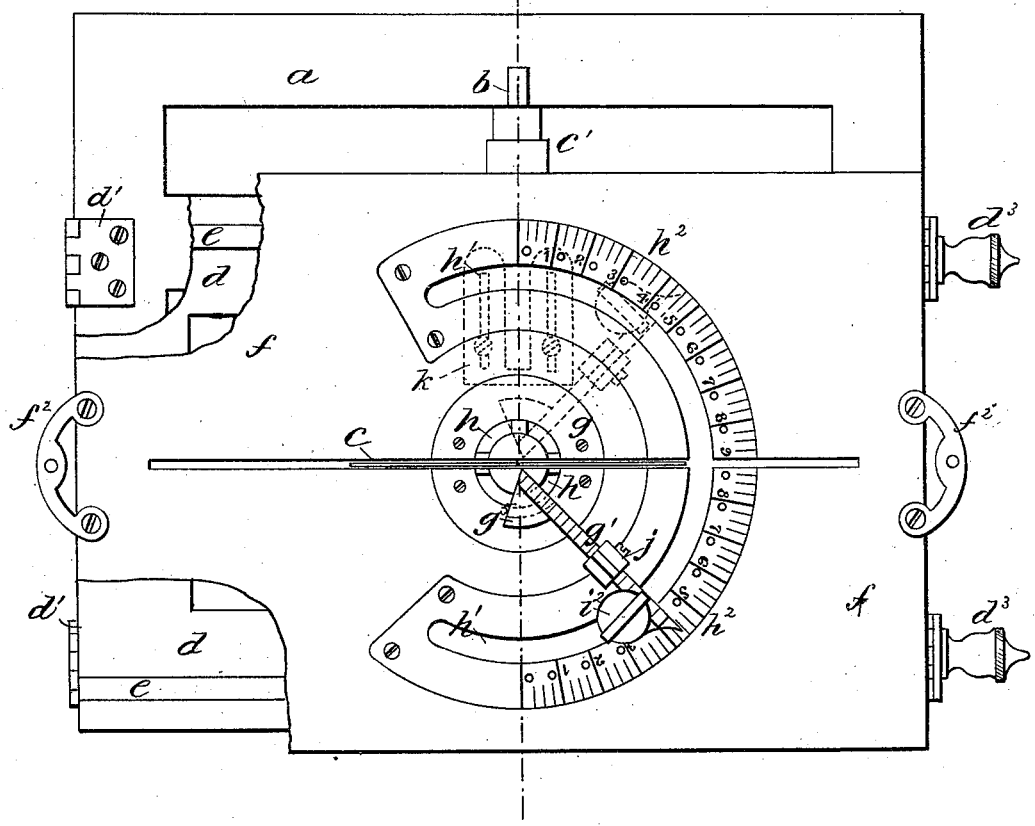
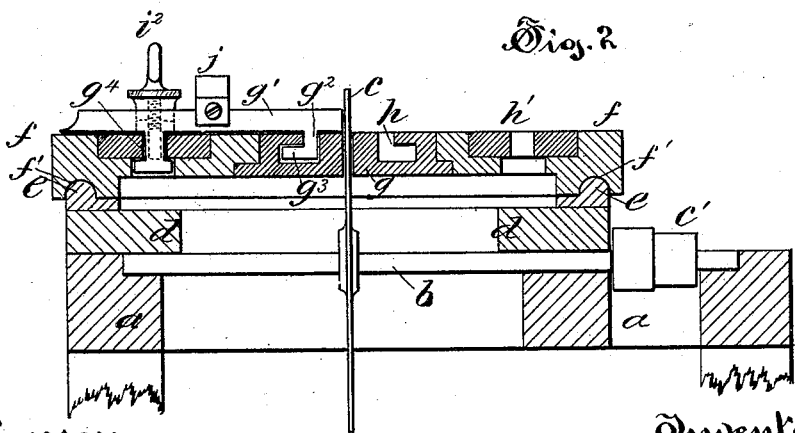
Witnesses:
Harry R. Williams.
Arthur B. Jenkins.
Inventor,
Edward Schmitz
by Simonds & Burdett,
attys (No Model.) 2 Sheets—Sheet 2.
E. SCHMITZ.
MITERING ATTACHMENT FOR CIRCULAR SAWS.
No. 420,739. Patented Feb. 4, 1890.
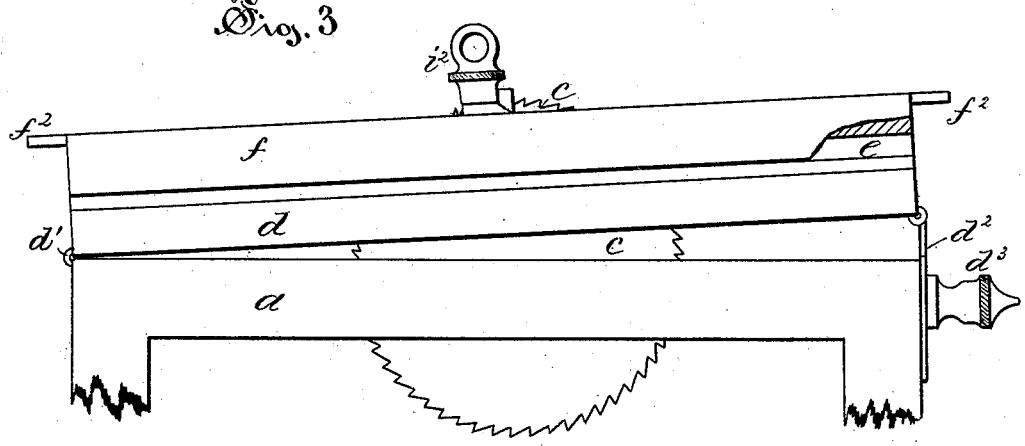
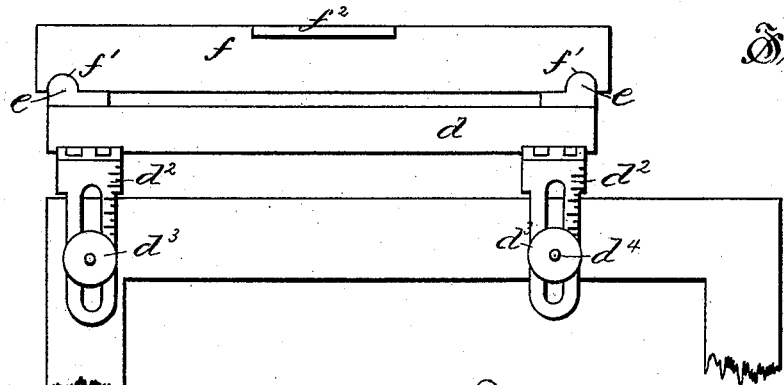
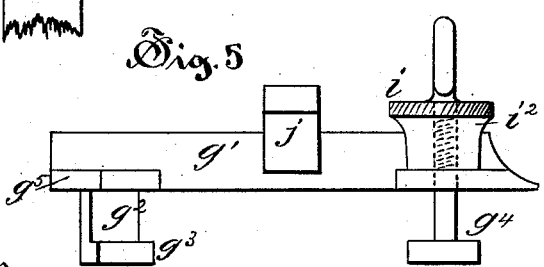

UNITED STATES PATENT OFFICE.

EDWARD SCHMITZ, OF WINSTED, CONNECTICUT.

MITERING ATTACHMENT FOR CIRCULAR SAWS.

SPECIFICATION forming part of Letters Patent No. 420,739, dated February 4, 1890.

Application filed July 10, 1889. Serial No. 317,024. (No model.)

*To all whom it may concern:*

Be it known that I, EDWARD SCHMITZ, of Winsted, in the county of Litchfield and State of Connecticut, have invented certain new and useful Improvements in Mitering Attachments for Circular Saws, of which the following is a full, clear, and exact description, whereby any one skilled in the art can make and use the same.

My invention relates to the class of machine-saws in which there is used a reciprocating table or carriage; and my object is to provide such a machine with a device by means of which the ordinary work may be accomplished, and at the same time a cut can be made at any desired angle across a piece of work held on the carriage.

To this end my invention consists in the combination, with a circular saw or like machine, of a reciprocating carriage and a guide having means of angular adjustment; and it further consists in details of the several parts making up the machine as a whole, and in their combination, as more particularly hereinafter described, and pointed out in the claims.

Referring to the drawings, Figure 1 is a top or plan view of a circular saw embodying my invention. Fig. 2 is a view in vertical section through the carriage on enlarged scale. Fig. 3 is a detail side view of the upper part of the machine. Fig. 4 is a detail end view of the machine. Fig. 5 is a detail end view, on enlarged scale, of the adjustable gage.

In the accompanying drawings, the letter $a$ denotes the frame of the machine, which may be of any ordinary material and form; $b$, the saw-shaft, mounted in bearings in the frame; $c$, a circular saw fixed on the frame, and $c'$ a driving-pulley also fixed to the saw-shaft in position to receive a belt for driving it from a counter-shaft or any other suitable source of power.

On the upper part of the frame of the machine is hinged or pivoted the vertically-adjustable bed $d$, that is preferably hinged to one side of the frame, as at $d'$, and bears on the other end of the frame the downturned arms $d''$, that are slotted for the passage of a clamp-bolt $d^4$, supporting a screw-clamp $d^3$, by means of which the frame may be held in any desired position of vertical adjustment within the limits of the means of attachment and adjustment. These arms are provided with graduations that are used in connection with an index-mark on the bed, so that by their use this bed may be set level across the plane of the saw, and also at the desired position of angular adjustment in a plane lengthwise of the bed. This bed bears on the outer edges in lines parallel with the plane of the saw the rails $e$, that are preferably of such shape in cross-section as to enable the carriage $f$ to be reversed end for end on these supporting-rails, for the purpose that will be hereinafter described.

The carriage $f$ is made of any convenient material, having on its under side the grooves $f'$ or equivalent means of supporting and guiding the carriage in its lengthwise movement along the bed; and it has also preferably on the opposite ends the handles $f''$, that project beyond the ends of the carriage and have a solid part of the carriage between the inner side of the handle and the end of the saw-groove.

About midway of the carriage and with its center in the saw-groove is secured a socket-piece $g$ for an adjustable gage $g'$, that is capable of angular adjustment with reference to the saw-groove. In order to adapt this gage for the uses intended, it must not only be capable of being set at an angle with the plane of the saw, but it must also be provided with means for securing it in any desired position of angular adjustment, and for this purpose the gage is provided near its inner end with an arm $g''$, that projects through a slot $h$ in the center piece, this slot being preferably circular in outline and arranged concentric with the center of the socket-piece. The arm $g''$ has a hooked lower end $g^3$, that engages the under side of the socket-piece in such manner as to hold the gage not only against lengthwise play, but any depthwise movement on the carriage. The outer end of the gage has also an arm $g^4$, that projects through a circular slot $h'$, formed in the carriage and concentric with the socket-piece, this arm $g^4$ forming a guide and additional means of holding the gage against lengthwise movement, and it also affords a bearing for a clamp $i$, that in the form shown consists of a screw-bolt, the head of which underlies the lower part of the carriage and its upper end supports a nut $i''$, located on the upper surface of the carriage, in order to be more readily accessible for the purpose of clamping and unclamping the gage. The gage extends beyond the groove $h'$, and it forms an index or pointer, so that the gage may be accurately set at any desired angle, a graduated arc $h''$ being provided on the carriage either in the shape of an extra piece set into the substance of the carriage, or the graduations may be marked directly upon the upper surface of the carriage.

The gage $g'$ when set at any desired angle is held in place by tightening up the clamp, the two slots being concentric, so that when the outer end is clamped the arm on the inner end bears against the curved slot in such manner as to hold that end of the gage against movement; but in order to provide an additional means of security at this end any convenient device may be used to clamp the gage firmly when the gage is to be secured at any given angle. The slots $h$ $h'$ extend for any desired distance on both sides of the saw-groove in the carriage, and two of these gages are provided, their working-faces being turned toward the same end of the carriage. By means of this adjustable gage a miter of any desired angle may be cut, as for the purpose of box-making or frame-making, and having set the gages a frame can be cut to proper miter very rapidly, using whichever of the two gages the job immediately in hand may call for.

The gage is provided with an adjustable rest $j$, that may be set at any desired distance from the saw-groove, the gage being graduated in inches and parts of inches.

It is often desirable in cutting angularly across the fiber of wood that the saw-cut should be made with rather than against the grain, and this may be done when my improvement is embodied in a machine by setting the gage, and after cutting one end of a piece reversing the carriage end for end on the bed and, without changing the position of the gage, cutting the other end.

In addition to the above-described mitering attachment, the table is provided with the usual gage $k$, that is adjustably secured to it by means of the screws or bolts $k'$ in the ordinary manner, and this gage is removably secured to the table in such manner as not to interfere with the operation of the mitering attachment.

I do not limit myself to the particular construction of the socket-piece, guide-grooves, and adjustable gage, nor to the means specifically described for adjustably securing the gage to the carriage, as these may be modified in several points without departing from the main feature of the invention.

The object of providing for the vertical adjustment of the bed is to afford a means of cutting a groove that does not extend completely through the work, and this is accomplished by limiting the distance that the saw will project above the carriage by lifting or depressing the bed and fixing it in position by the means described.

I claim as my invention—

1. In combination with the reciprocating carriage having the saw-groove, the circular socket bearings or guides, and an adjustable gage removably attached to the carriage and having the gage-clamps, all substantially as described.

2. In combination with the reciprocating carriage having the saw-groove, the circular socket bearings or guides, the adjustable gage with the gage-clamps, and the graduated arc on the surface of the carriage, all substantially as described.

3. In combination with the frame of a machine-saw, the vertically-adjustable bed having guideways, the reciprocating carriage reversibly mounted on the guideways and having a saw-groove, and the radially-arranged gage adjustably attached to the carriage, all substantially as described.

4. In combination with the reciprocating carriage $f$, having a saw-groove, the socket-piece having the circular groove, the adjustable gage having an arm located in said groove, the clamp device borne on the adjustable gage, and the graduated arc on the carriage, all substantially as described.

5. In combination with the reversible and reciprocating carriage $f$, having a saw-groove, the circular socket bearings or guides for a gage extending upon both sides of the saw-groove, the adjustable gage removably attached to the carriage, and the gage-clamps, all substantially as described.

6. In combination with the reciprocating carriage having a saw-groove, the circular socket bearings or guides for an adjustable gage, the adjustable gage mounted on the carriage and having the clamping device extending into the grooves, and the adjustable rest attached to the gage, all substantially as described.

EDWARD SCHMITZ.

Witnesses:
 HENRY GAY,
 JEFFREY F. COOKE.